United States Patent [19]

Namiki et al.

[11] Patent Number: 4,673,991
[45] Date of Patent: Jun. 16, 1987

[54] VIDEO SIGNAL RECORDING AND/OR REPRODUCING APPARATUS HAVING A FUNCTION OF CARRYING OUT ASSEMBLED RECORDINGS

[75] Inventors: Yasuomi Namiki; Satoshi Kawasaki, both of Yokohama, Japan

[73] Assignee: Victor Company of Japan, Ltd., Yokohama, Japan

[21] Appl. No.: 703,830

[22] Filed: Feb. 21, 1985

[30] Foreign Application Priority Data

Feb. 24, 1984 [JP] Japan .................................. 59-34750

[51] Int. Cl.[4] ...................... G11B 27/32; H04N 5/782
[52] U.S. Cl. .................................. 360/14.1; 360/14.2; 360/70
[58] Field of Search ..................... 360/14.1, 14.2, 10.3, 360/72.1, 70, 74.1, 74.4, 77, 33.1; 358/311

[56] References Cited

U.S. PATENT DOCUMENTS 3,890,639  6/1975  O'Donnell et al. ................. 360/14.1
3,896,489  7/1975  Rudert et al. ....................... 360/14.2
4,482,926  11/1984  Nishijima et al. ................. 360/14.2
4,488,185  12/1984  Toba ................................... 360/14.1
4,570,192  2/1986  Hori ................................... 360/14.2

Primary Examiner—Raymond F. Cardillo
Assistant Examiner—Robert A. Weinhardt
Attorney, Agent, or Firm—Michael N. Meller

[57] ABSTRACT

A video signal recording and/or reproducing apparatus comprises a switch for interrupting a recording when manually turned ON and for resuming the recording when manually turned OFF, a circuit for moving a tape in a forward direction during a recording mode, stopping the tape after moving the tape in a reverse direction over a predetermined distance responsive to an ON state of the switch and moving the tape in the forward direction responsive to an OFF state of the switch, a circuit for generating a joint indication signal and a recording interruption indication signal responsive to the ON state of the switch, a circuit for recording the joint indication signal on the tape and for reproducing the joint indication signal from the tape when the tape moves in the forward direction after being moved in the reverse direction and stopped, a circuit for producing a recording start command signal responsive to a detection of a reproduced joint indication signal, and a circuit for interrupting a recording of a video signal on the tape responsive to the recording interruption indication signal and for resuming a recording of another video signal on the tape responsive to the recording start command signal.

6 Claims, 17 Drawing Figures

VIDEO SIGNAL RECORDING AND/OR REPRODUCING APPARATUS HAVING A FUNCTION OF CARRYING OUT ASSEMBLED RECORDINGS

BACKGROUND OF THE INVENTION

The present invention generally relates to video signal recording and/or reproducing apparatuses having a function of carrying out assembled recordings, and more particularly to a video signal recording and/or reproducing apparatus which carries out an assembled recording by once stopping the recording operation, moving a tape in a reverse direction over a predetermined distance and then resuming the tape travel in a forward direction so as to start a new recording in continuance with a previous recording. The video signal recording and/or reproducing apparatus according to the present invention is designed to minimize an overlap between the previous recording and the new recording.

Generally, in a video signal recording and/or reproducing apparatus and especially in a video signal recording and/or reproducing apparatus which records an image-picked up video signal from a television camera on a tape, the apparatus is frequently operated in such a manner that the recording operation is temporarily stopped during the recording operation and the recording operation is resumed thereafter. It is common to operate the apparatus in this manner when using a portable television camera and recording the image-picked up video signal on the tape by a portable recording and/or reproducing apparatus.

When the power source switch is turned OFF in order to temporarily stop the recording operation while recording the image-picked up video signal from the television camera related to a certain picture, rotary heads stop rotating and the tape stops traveling. Thus, the tape which is drawn out of a cassette and is loaded into a predetermined tape path within the apparatus when the recording is started, is drawn back into the cassette and is unloaded. Hence, when the mode of the apparatus is set to the recording mode and the tape is drawn out of the cassette and is loaded into the predetermined tape path so as to resume the recording of the image-picked up video signal related to another picture, the tape position with respect to the heads before the tape unloading operation will not accurately coincide with the tape position after the tape is loaded again to resume the recording operation. Accordingly, when the recording operation is resumed after carrying out the tape unloading and loading operations as described above, an unrecorded part may be formed on the tape between a previously recorded part and a newly recorded part, or an overlapping part may be formed on the tape when the recording is resumed from a part overlapping the previously recorded part.

In order to eliminate the unwanted deviation in the tape position introduced during the tape unloading and loading operations, the tape is maintained in the state loaded in the predetermined tape path during predetermined modes of the apparatus, that is, measures are taken to prevent the tape from being unloaded during the predetermined modes of the apparatus. However, even when such measures are taken to maintain the tape in the loaded state, the traveling tape does not stop immediately after an operation is carried out to temporarily stop the tape, due to inertia of a tape feeding system. As a result, the tape actually stops after traveling over a certain distance. Further, when resuming the tape travel so as to resume the recording operation, it will take a certain time period for the tape traveling speed to reach a predetermined tape traveling speed. Accordingly, when the recording operation is resumed by simply resuming the tape travel from a position where the tape stopped, stable recording cannot be carried out during the initial period of the resumed recording operation. Thus, when a tape recorded in this manner is played, the servo operation becomes unstable at a joint part between the two recordings, that is, at the part where the recording is temporarily stopped and then resumed thereafter. Therefore, there is a problem in that the reproduced picture will become distorted at the joint part. In addition, when the recording operation is resumed after the tape travel is resumed and the tape traveling speed has reached the predetermined tape traveling speed, an unrecorded part will be formed on the tape between the previously recorded part and the newly recorded part, and the reproduced picture will become unsatisfactory for viewing between the two recording parts.

In order to prevent such problems from being introduced when the recording operation is temporarily stopped, a supply reel is automatically rotated in a tape take-up direction so as to rewind a predetermined quantity of tape before stopping the tape. By taking such a measure, the tape traveling speed will reach the predetermined tape traveling speed while the tape travel is resumed and the tape travels over a distance approximately corresponding to the rewound quantity of tape, when the recording operation is resumed. Moreover, the new recording can be carried out satisfactorily in continuance with the previously recorded part when the recording operation is resumed after the tape traveling speed has reached the predetermined tape traveling speed.

The assembled recording in which the recording operation is once stopped, the tape is moved in the reverse direction over a predetermined distance and stopped, and the tape is then moved in the forward direction and the new recording is started after the tape has traveled in the forward direction over the predetermined distance, is disclosed in U.S. patent applications Ser. No. 404,395 and Ser. No. 496,129, now U.S. Pat. Nos. 4,573,090 and 4,554,604 respectively, in which the assignee is the same as the assignee of the present application, for example.

When rewinding the tape over the predetermined distance and stopping the tape after the recording operation is once stopped, and when moving the tape over the predetermined distance and starting the new recording after the tape travel is resumed, the number of control pulses reproduced from the tape is counted in order to detect that the tape has traveled over the predetermined distance. Alternatively, the number of pulses generated from a frequency generator which is coupled to a capstan motor, is counted to detect that the tape has traveled over the predetermined distance.

However, the tape traveling speed is extremely low when the tape is being stopped and when the tape is being started to travel. For this reason, the reproduction of the control pulses, the generation of the pulses by the frequency generator, and the counting of the pulses cannot be performed accurately during these times. As a result, it is impossible to accurately detect whether the tape has traveled over the predetermined distance during these times. Accordingly, in order to prevent an unrecorded part from being formed between the end of the previously recorded part and the start of the newly recorded part, the conventional apparatus starts the new recording before the end of the previous recording is reached. In other words, when the tape is rewound over the predetermined distance and the tape travel is then resumed in the forward direction, the new recording is started from a position overlapping a part of the previous recording. For example, in the actual conventional apparatus, this overlap between the previous recording and the new recording on the tape exists over a distance corresponding to three to four the video signal frames.

At the overlap between the previous recording and the new recording, the pre-recorded signals of the previous recording are substantially erased by the new signals of the new recording, but an interference is introduced in the color signal. Hence, a reproduced picture having a satisfactory picture quality cannot be obtained from the overlap. In order to obtain a reproduced picture having a satisfactory picture quality, it is desirable that the overlap is extremely small or does not exist. However, in the conventional apparatus, the overlap is made intentionally as described before so as to reduce the chances of an unrecorded part being formed between the previous recording and the new recording.

SUMMARY OF THE INVENTION

Accordingly, it is a general object of the present invention to provide a novel and useful video signal recording and/or reproducing apparatus having a function of carrying out assembled recordings, in which the problems described heretofore are eliminated.

Another and more specific object of the present invention is to provide a video signal recording and/or reproducing apparatus which records a joint indication signal on a control track when the recording operation is once stopped, stops the tape after rewinding the tape over a predetermined distance, resumes the tape travel in a forward direction, and starts a new recording when the joint indication signal is reproduced during an assembled recording. According to the apparatus of the present invention, it is possible to essentially eliminate an overlap at a joint between a previous recording and the new recording, and it is thus possible to carry out a satisfactory assembled recording.

Still another object of the present invention is to provide a video signal recording and/or reproducing apparatus which changes the duty factor of falling edges of a control signal having rising edges which are essential for controlling the functions of the apparatus, and uses the falling edges having the changed duty factor as the joint indication signal without having to record a special signal as the joint indication signal. According to the apparatus of the present invention, the desired assembled recording can be carried out in conformance with the existing standard for home use video tape recorders (VTRs), according to which standard no other signal is recorded on the control track besides the control signal.

Other objects and further features of the present invention will be apparent from the following detailed description when read in conjunction with the accompanying drawings.

DETAILED DESCRIPTION

Figure 1:
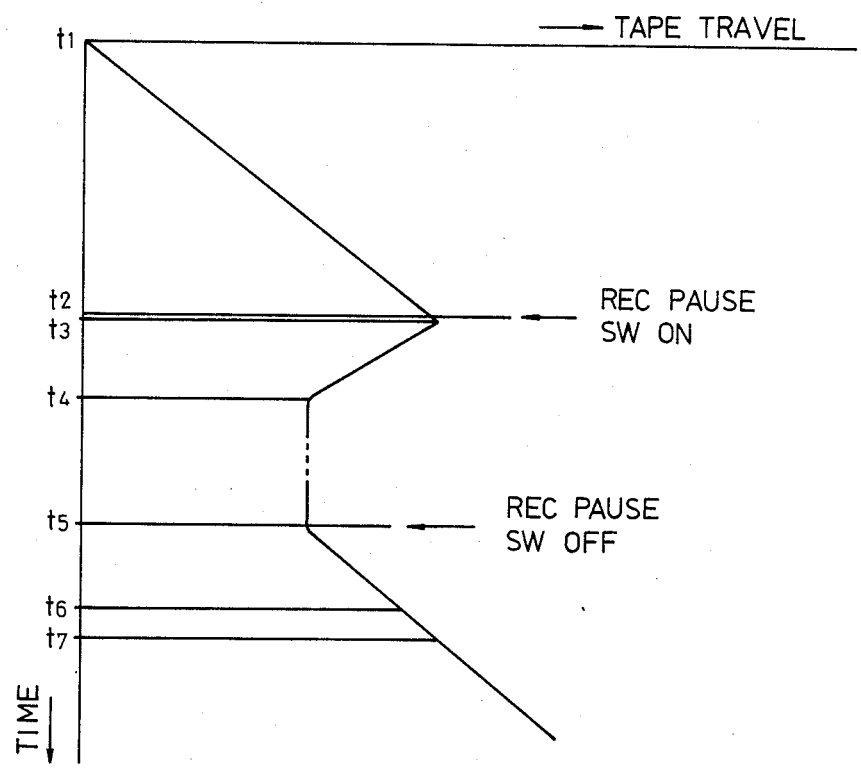
FIG. 1 is a diagram showing the relationship between the tape traveling direction and the tape traveling quantity with respect to time for the purpose of explaining the assembled recording operation of the video signal recording and/or reproducing apparatus according to the present invention.
Figure 2:
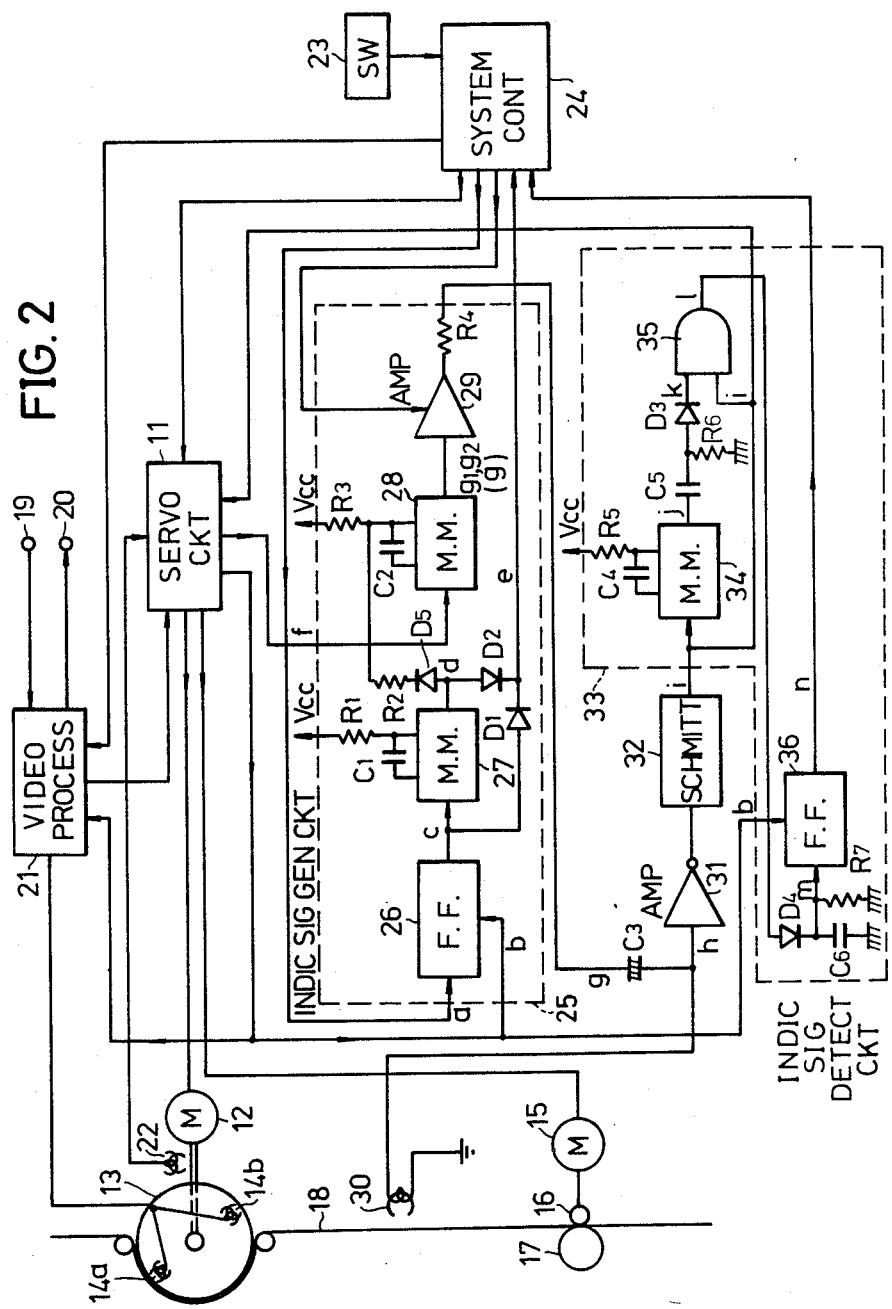
FIG. 2 is a system circuit diagram showing an embodiment of a circuit system of the video signal recording and/or reproducing apparatus according to the present invention.

First, a general description will be given with respect to the assembled recording operation of the video signal recording and/or reproducing apparatus (hereinafter simply referred to as an apparatus) according to the present invention by referring to FIG. 1. It will be assumed that the mode of the apparatus is set to a recording mode from a time $t_1$ and a recording pause switch 23 shown in FIG. 2 is turned ON at a time $t_2$ so as to once stop the recording. As will be described later on in the specification, a joint indication signal is recorded on a control track of a tape during a minute time period between times $t_2$ and $t_3$. At the time $t_3$, the mode of the apparatus is set to a reproducing mode and a capstan rotates in a reverse direction. Hence, the tape is taken up on a supply reel in the state where the tape is loaded in a predetermined tape path, and the tape travels in the reverse direction. While the tape is traveling in the reverse direction, the number of peak values of a frequency signal generated from a frequency generator which is provided on a reel or the capstan is counted. When the count reaches a predetermined value, the rotating reels are stopped. The tape stops traveling at a time $t_4$.

The recording pause switch 23 is turned OFF at a time $t_5$ when an assembled recording is to be carried out so as to start a new recording in continuance with the previous recording described before. The apparatus assumes the reproducing mode from the time $t_5$ and the capstan causes the tape to travel in a forward direction. The pre-recorded joint indication signal is detected after the tape traveling speed reaches a predetermined tape traveling speed. Due to the detection of the joint indication signal, the mode of the apparatus is switched to the recording mode at a time $t_7$ and the new recording is started in continuance with the end of the previous recording.

According to the apparatus of the present invention, there is essentially no overlap between the previous recording and the new recording because the new recording is started upon reproduction of the pre-recorded joint indication signal which is recorded when the previous recording is once stopped. On the other hand, the conventional apparatus counts the reproduced control pulses or the output pulses of the frequency generator after the time $t_5$, and the measurement of the tape traveling distance is inaccurate. Hence, in order to prevent an unrecorded part from being formed between the previous recording and the new recording, the conventional apparatus is designed to start the new recording from a time $t_6$ which is before the time $t_7$. For this reason, an overlap of the previous and new recordings occurs between the times $t_6$ and $t_7$ according to the conventional apparatus. However, the apparatus according to the present invention is designed to start the new recording from the time $t_7$, and thus, there is essentially no overlap between the previous and new recordings.

Next, a description will be given with respect to an embodiment of the apparatus according to the present invention by referring to FIG. 2. During the recording mode from the time $t_1$, a drum motor 12 rotates under control of a servo circuit 11 so as to rotate a rotary drum 13 having video heads 14a and 14b mounted at diametrical positions thereof. A capstan motor 15 also rotates under control of the servo circuit 11 so as to rotate a capstan 16. Hence, a magnetic tape 18 is driven in a state pinched between the capstan 16 and a pinch roller 17, and travels at a predetermined traveling speed. A video signal which is to be recorded is applied to an input terminal 19, and is supplied to a video signal processing circuit 21 wherein the video signal is subjected to a predetermined signal processing. The processed video signal from the video signal processing circuit 21 is supplied to the video heads 14a and 14b and is recorded on the traveling tape 18. During the reproducing mode, the signal reproduced from the tape 18 by the video heads 14a and 14b is obtained through an output terminal 20. Depending on the rotation of the motor 12, a drum pulse signal is obtained from a pickup head 22 which opposes a magnet mounted on a rotary shaft of the motor 12. The drum pulse signal is supplied to the servo circuit 11.

Figure 3:
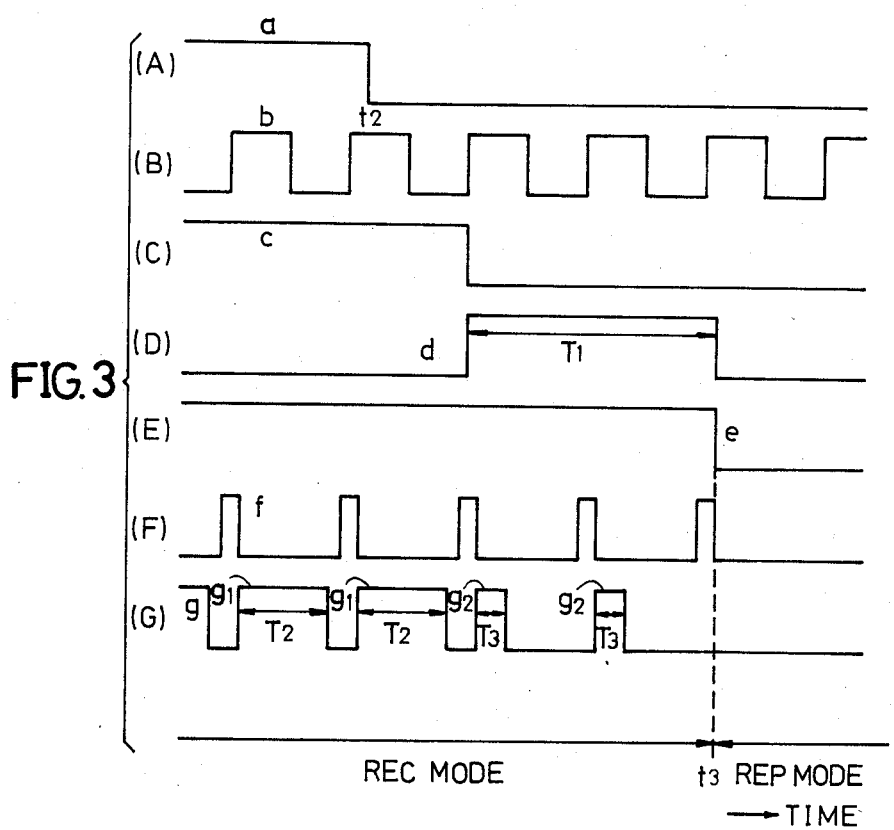
FIGS. 3(A) through 3(G) show signal waveforms for explaining the operation of the apparatus according to the present invention when once stopping the tape travel.

When the recording pause switch 23 is turned ON at the time $t_2$ so as to interrupt the recording, a system controller 24 having a built-in microcomputer produces a pause signal a shown in FIG. 3(A). This pause signal a is supplied to a D-type flip-flop 26 within a joint indication signal generating circuit 25. A drum pulse signal b shown in FIG. 3(B) is applied to a clock terminal of the flip-flop 26 as a clock signal from the servo circuit 11. A signal c shown in FIG. 3(C) which falls responsive to a first rise in the drum pulse signal b within the low-level period of the pause signal a, is obtained from the flip-flop 26.

The output signal c of the flip-flop 26 is supplied to a monostable multivibrator 27. A signal d shown in FIG. 3(D) which rises responsive to a fall in the signal c and then falls after a time $T_1$ (for example, a time corresponding to two video signal frames) which is dependent on a time constant determined by the capacitance of a capacitor $C_1$ and the resistance of a resistor $R_1$ which are coupled to the monostable multivibrator 27. The output signal c of the flip-flop 26 and the output signal d of the monostable multivibrator 27 are supplied to a wired OR circuit comprising diodes $D_1$ and $D_2$. A signal e shown in FIG. 3(E) is obtained from this wired OR circuit and is supplied to the system controller 24 as a recording interruption indication signal.

A capacitor $C_2$ and a resistor $R_2$ are coupled to a monostable multivibrator 28. A connection point between the capacitor $C_2$ and a resistor $R_3$ is coupled to the output side of the monostable multivibrator 27 through a diode $D_5$ and the resistor $R_2$. A control signal f shown in FIG. 3(F) is supplied to the monostable multivibrator 28 from the servo circuit 11. During the low-level period of the output signal d of the monostable multivibrator 27, the monostable multivibrator 28 is unaffected by the resistor $R_2$. Accordingly, during the low-level period of the signal d, the monostable multivibrator 28 produces a signal $g_1$ shown in FIG. 3(G) which rises responsive to a fall in the signal f and then falls after a time $T_2$ which is dependent on a time constant determined by the capacitance of the capacitor $C_2$ and the resistance of the resistor $R_3$. When the signal d assumes a high level, the diode $D_5$ is turned ON and the resistor $R_2$ is essentially coupled to the monostable multivibrator 28. Accordingly, the monostable multivibrator 28 produces in this case a signal $g_2$ shown in FIG. 3(G) which rises responsive to a fall in the signal f and then falls after a time $T_3$ which is dependent on a time constant determined by the capacitance of the capacitor $C_2$ and the resistance of the parallel-connected resistors $R_2$ and $R_3$, where the time $T_3$ is smaller than the time $T_2$. For example, the duty factor of the signal $g_1$ is equal to 75% and the duty factor of the signal $g_2$ is equal to 25%.

The timings with which the output signals $g_1$ and $g_2$ (hereinafter also generally referred to as a signal g) of the monostable multivibrator 28 rise are determined by the timing with which the signal f falls, and the period with which the output signal g of the monostable multivibrator 28 rises is therefore constant. On the other hand, the timings with which the signals $g_1$ and $g_2$ fall are respectively dependent on the times $T_2$ and $T_3$ which are determined by different time constants. Hence, the period with which the signal g falls changes at a point where the signal $g_1$ changes to the signal $g_2$. This change in the period with which the signal g falls is used to detect a joint indication signal as will be described hereinafter.

The output signal g of the monostable multivibrator 28 is amplified in a recording amplifier 29, and is supplied to a control head 30 through a resistor $R_4$ and a capacitor $C_3$. The signal g is thus recorded on a control track of the tape 18. The amplifier 29 receives a high-level signal from the system controller 24 during the recording mode, and is activated only during the recording mode.

After the time $T_1$ elapses from the rise in the signal d, the signal e supplied to the system controller 24 falls at the time $t_3$ and assumes a low level. Responsive to the fall in the signal e, the system controller 24 supplies a reverse rotation command signal to the servo circuit 11 so as to rotate the motor 15 in the reverse direction. The tape 18 travels in the reverse direction and is taken up on a supply reel (not shown) which rotates in the tape take-up direction. In other words, the tape 18 is rewound. At the same time, the system controller 24 supplies a recording interrupt command signal to the video signal processing circuit 21 so as to put the video signal processing circuit 21 in a recording interrupt state. Further, the signal applied to the amplifier 29 from the system controller 24 assumes a low level, and the amplifier 29 is deactivated. Hence, no control signal is recorded on the tape 18 as the tape 18 travels in the reverse direction. The system controller 24 supplies a stop signal to the servo circuit 11 and stops the motor 15 after counting a predetermined number of output signals of a frequency generator (not shown) which is provided on a reel or the capstan 16, or after a predetermined time determined by a built-in timer of the system controller 24 elapses. As a result, the tape 18 stops traveling in the reverse direction at the time $t_4$. The distance over which the tape 18 travels in the reverse direction need not be strictly selected. The distance over which the tape 18 travels in the reverse direction simply needs to be sufficiently long so that when the tape travel in the forward direction is thereafter resumed, the tape traveling speed increases from zero to a predetermined tape traveling speed before the new recording (assembled recording) is started.

Next, when the recording pause switch 23 is turned OFF at the time $t_5$, the system controller 24 supplies a forward rotation command signal to the servo circuit 11. Thus, the motor 15 rotates in the forward direction and the tape 18 starts to travel in the forward direction. In this state, the signal applied to the amplifier 19 from the system controller 24 still assumes the low level, and the amplifier 19 remains in the deactivated state.

Figure 4:
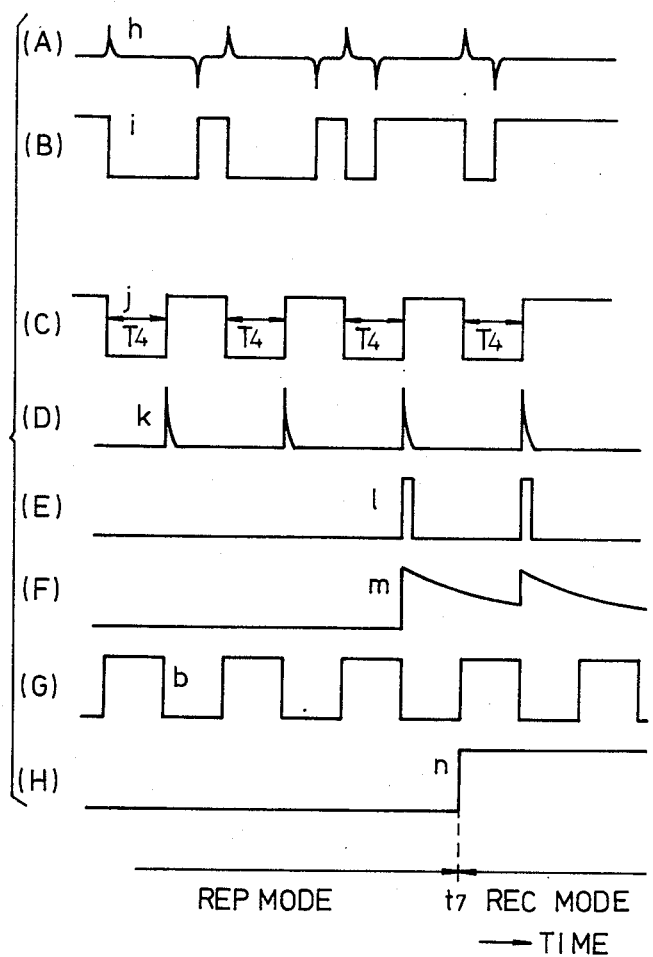
FIGS. 4(A) through 4(H) show signal waveforms for explaining the operation of the apparatus according to the present invention when starting an assembled recording.

A signal h shown in FIG. 4(A) having a differentiated waveform at the rises and falls in the recorded signal g, is reproduced from the control track of the tape 18 by the control head 30. The reproduced signal h is inverted and amplified in an inverting amplifier 31 and is supplied to a Schmitt trigger circuit 32 which produces a signal i shown in FIG. 4(B). The signal i is supplied to a monostable multivibrator 34 within a joint indication signal detecting circuit 33. The monostable multivibrator 34 produces a signal j shown in FIG. 4(C) which falls responsive to a fall in the signal i and then rises after a time $T_4$ which is dependent on a time constant determined by the capacitance of a capacitor $C_4$ and the resistance of a resistor $R_5$ which are coupled to the monostable multivibrator 34. The time $T_4$ is selected so that the duty factor of the signal j becomes equal to 50%.

The signal j is differentiated in a differentiating circuit comprising a capacitor $C_5$ and a resistor $R_6$. A diode $D_3$ obtains only the positive polarity differentiated pulses and applies these positive polarity differentiated pulses to one input terminal of an AND gate 35 as a signal k shown in FIG. 4(D). The output signal i of the Schmitt trigger circuit 32 is applied to the other input terminal of the AND gate 35. The AND gate 35 performs a logical multiplication between the signals k and i, and produces a signal l shown in FIG. 4(E). In other words, the signal k corresponds to the low-level part of the signal i when the reproduced signal h corresponds to the recorded signal $g_1$ and the signal k corresponds to the high-level part of the signal i when the reproduced signal h corresponds to the recorded signal $g_2$, and the signal l is produced from the AND gate 35 as the joint indication signal. Accordingly, the changing point where the signal g changes from the signal $g_1$ to the signal $g_2$ is detected.

The output signal l of the AND gate 35 is passed through a diode $D_4$ and is supplied to an integrating circuit comprising a capacitor $C_6$ and a resistor $R_7$. The integrating circuit produces a signal m shown in FIG. 4(F) and supplies the signal m to a flip-flop 36. A drum pulse signal b shown in FIG. 4(G) which is the same as the drum pulse signal b shown in FIG. 3(B), is applied to a clock terminal of the flip-flop 36 as a clock signal from the servo circuit 11. The flip-flop 36 produces a signal n shown in FIG. 4(H) which rises responsive to a first rise in the clock signal b during the high-level period of the signal m. The signal n is supplied to the system controller 24 as an assembled recording start command signal.

The system controller 24 which receives the signal n, sets the servo circuit 11 and the video signal processing circuit 21 to the recording mode at the time $t_7$. Hence, a new video signal which is to be recorded and is applied to the input terminal 19, is passed through the video signal processing circuit 21 and is recorded on the tape 18 by the video heads 14a and 14b.

The assembled recording of the new video signal is started by detecting the pre-recorded joint indication signal which is recorded when the recording is interrupted. Hence, a relatively long overlap will not be formed between the previous recording and the new recording as in the case of the conventional apparatus. According to the apparatus of the present invention, even when an overlap does occur between the previous recording and the new recording, the length of the overlap on the tape 18 is short and corresponds to approximately one video signal frame at the maximum. Hence, the new recording can be made in satisfactory continuance with the previous recording. After the signal l is no longer detected, the signal m gradually assumes a low level and the level of the signal n also changes to a low level, but the system controller 24 maintains the recording mode.

Numerical examples of the capacitances and resistances of the resistors and capacitors and the time constants of the circuit shown in FIG. 2 are given below.

| Capacitors | Resistors | Time Constants |
| --- | --- | --- |
| $C_1$ = 100,000 pF | $R_1$ = 600 kΩ | $T_1 \approx$ 66 msec |
| $C_2$ = 100,000 pF | $R_3$ = 250 kΩ | $T_2 \approx$ 25 msec |
| $C_4$ = 100,000 pF | $R_2$ = 124 kΩ | $T_3 \approx$ 8.3 msec |
|  | $R_5$ = 160 kΩ | $T_4 \approx$ 16 msec |

The timing with which the control signal rises is originally used to control the functions of the apparatus during the reproducing mode. In the embodiment described heretofore, the timing with which the control signal falls, which timing is not essential to control the functions of the apparatus during the reproducing mode, is made different from the regular timing. In other words, the timing with which the control signal falls is made different from that of the regular control signal $g_1$ and is made the same as that of the signal $g_1$. The joint indication signal is detected by detecting the point when the timing with which the control signal falls changes. For this reason, it is unnecessary to record a special indication signal on the control track. Hence, the embodiment can be applied to a standard recording format in which no signal is recorded on the control track besides the control signal. However, the present invention is not limited to this embodiment, and an independent joint indication signal may be recorded on the control track besides the control signal.

Further, the present invention is not limited to these embodiments, but various variations and modifications may be made without departing from the scope of the present invention.

What is claimed is:

1. A video signal recording and/or reproducing apparatus comprising:
    video signal recording means for recording a video signal on a tape;
    recording interrupting switch means for interrupting a recording when manually turned ON and for resuming the recording when manually turned OFF;
    tape driving means for moving the tape in a forward direction during a recording mode, said tape driving means stopping the tape after moving the tape in a reverse direction for a predetermined distance responsive to an ON state of said recording interrupting switch means and moving the tape in the forward direction responsive to an OFF state of said recording interrupting switch means;

generating means for generating a joint indication signal for a predetermined time period when said recording interrupting means is turned ON and a recording interruption indication signal after said predetermined time period elapses;

joint indication signal recording and reproducing means for recording the joint indication signal from said generating means on the tape and for reproducing the joint indication signal from the tape when the tape moves in the forward direction after being moved in the reverse direction and stopped;

detecting means for producing a recording start command signal responsive to a detection of the joint indication signal reproduced by said joint indication signal recording and reproducing means; and recording controlling means for interrupting a recording of the video signal on the tape responsive to the recording interruption indication signal from said generating means and for resuming a recording of another video signal on the tape responsive to the recording start command signal from said detecting means, the tape being moved in the reverse direction for said predetermined distance and being stopped by said tape driving means in a state where said recording controlling means interrupts the recording of the video tape on the tape.

2. A video signal recording and/or reproducing apparatus as claimed in claim 1 in which said generating means generates a control signal having a predetermined width with a predetermined period, and generates as said joint indication signal, responsive to the ON state of said recording interrupting switch means, a signal having a width different from said predetermined width and having a period identical to said predetermined period.

3. A video signal recording and/or reproducing apparatus as claimed in claim 1 in which said generating means generates a control signal which rises with a predetermined period and falls with a predetermined duty factor, and generates as said joint indication signal, responsive to the ON state of said recording interrupting switch means, a signal which rises with a period identical to said predetermined period of said control signal and falls with a duty factor smaller than said predetermined duty factor of said control signal.

4. A video signal recording and/or reproducing apparatus as claimed in claim 1 in which said generating means generates a control signal having a predetermined width with a predetermined period, and generates as said joint indication signal, responsive to the ON state of said recording interrupting switch means, a signal having a width different from said predetermined width and having a period identical to said predetermined period, and said detecting means detects as said joint indication signal a signal within the signal reproduced by said joint indication signal recording and reproducing means having a width different from said predetermined width of said control signal.

5. A video signal recording and/or reproducing apparatus as claimed in claim 1 in which said generating means generates a control signal which rises with a predetermined period and falls with a predetermined duty factor, and generates as said joint indication signal, responsive to the ON state of said recording interrupting switch means, a signal which rises with a period identical to said predetermined period of said control signal and falls with a duty factor smaller than said predetermined duty factor of said control signal, and said detecting means detects as said joint indication signal a signal which is within the signal reproduced by said joint indication signal recording and reproducing means and falls with a duty factor smaller than said predetermined duty factor of said control signal.

6. A video signal recording and/or reproducing apparatus as claimed in claim 1 in which said joint indication signal recording and reproducing means includes a control head for recording and reproducing a control signal and said joint indication signal on and from a control track of said tape.

* * * * *